(12) United States Patent
Ahlen et al.

(10) Patent No.: US 9,018,594 B2
(45) Date of Patent: Apr. 28, 2015

(54) GLASS-PANEL LITHIUM-6 NEUTRON DETECTOR

(71) Applicant: Trustees of Boston University, Boston, MA (US)

(72) Inventors: Steven P. Ahlen, Wellesley, MA (US); Andrew Inglis, Brighton, MA (US); Hidefumi Tomita, Brookline, MA (US)

(73) Assignee: Trustees of Boston University, Boston, MA (US)

( * ) Notice: Subject to any disclaimer, the term of this patent is extended or adjusted under 35 U.S.C. 154(b) by 308 days.

(21) Appl. No.: 13/833,420

(22) Filed: Mar. 15, 2013

(65) Prior Publication Data
US 2014/0077091 A1    Mar. 20, 2014

Related U.S. Application Data

(60) Provisional application No. 61/637,645, filed on Apr. 24, 2012.

(51) Int. Cl.
*G01T 3/00* (2006.01)

(52) U.S. Cl.
CPC ..................... *G01T 3/008* (2013.01)

(58) Field of Classification Search
CPC ........................................ G01T 3/008
USPC ......... 250/389, 390.01–390.12, 269.1–269.8, 250/382
See application file for complete search history.

(56) References Cited

U.S. PATENT DOCUMENTS

| | | | |
|---|---|---|---|
| 3,076,895 A | 2/1963 | Baldwin | |
| 3,086,117 A | 4/1963 | Klein et al. | |
| 4,264,816 A * | 4/1981 | Walenta | 250/374 |
| 4,354,135 A * | 10/1982 | Mitrofanov et al. | 313/93 |
| 4,365,159 A * | 12/1982 | Young | 250/385.1 |
| 4,447,727 A | 5/1984 | Friesenhahn | |
| 4,481,421 A | 11/1984 | Young et al. | |
| 5,880,471 A | 3/1999 | Schelten et al. | |
| 6,867,444 B1 | 3/2005 | Hughes | |
| 7,514,694 B2 | 4/2009 | Stephan et al. | |
| 2002/0067789 A1 | 6/2002 | Wallace et al. | |
| 2004/0211315 A1 * | 10/2004 | Kretsinger et al. | 95/117 |
| 2006/0073276 A1 * | 4/2006 | Antonissen | 427/248.1 |
| 2006/0138340 A1 | 6/2006 | Ianakiev et al. | |
| 2010/0019164 A1 | 1/2010 | Stephan et al. | |
| 2011/0309261 A1 * | 12/2011 | Friedman et al. | 250/382 |

OTHER PUBLICATIONS

Park et al., "Neutron detection with a GEM," 2005, IEEE Transactions on Nuclear Science, vol. 52, No. 5, pp. 1689-1692.*

* cited by examiner

*Primary Examiner* — Kiho Kim
(74) *Attorney, Agent, or Firm* — BainwoodHuang (57) ABSTRACT

A thermal neutron detector includes a planar detector housing having two glass panels spaced apart by a gas-tight seal defining a detection chamber. Lithium foils adhered to inner surfaces of the glass panel emit alpha particles and tritons in response to incident thermal neutrons, and an inert detection gas is ionized to generate drift electrons. A planar array of detection wires is spaced from the lithium foils and extends outside the detection chamber. Electronic bias applies a field voltage between the wires and the lithium foils to establish a drift electric field to attract the drift electrons to the wires and provide a large electric field to cause electron multiplication. Detection circuitry detects electric signals in the wires generated by the drift of positive ions away from the wires and interprets the electrical signals as incidence of thermal neutrons on the detector.

22 Claims, 8 Drawing Sheets

GLASS-PANEL LITHIUM-6 NEUTRON DETECTOR

STATEMENT OF FEDERAL RIGHTS

This invention was made with US Government support under the following contracts. The Government has certain rights in the invention.
1. CBET-1036066 National Science Foundation
2. 2011-DN-077-ARI052-02 Department of Homeland Security

BACKGROUND OF THE INVENTION

A major effort to reducing the risk of a nuclear catastrophe is to deploy radiation detectors within a larger security architecture. One important component of radiation detection is neutron detection, since neutron detectors can aid in the detection of fissile material such as plutonium, and are components of systems that perform active interrogation to detect materials such as highly enriched uranium (HEU). The standard method for neutron detection uses $^3$He gas within a tube and signals read out by a central high voltage wire. The combination of high probability for the neutron/$^3$He interaction, full energy readout from the reaction, and the simple tube geometry makes the method a gold standard of neutron detection.

The limited supply of $^3$He and the demand on its use for other activities such as medical imaging and low-temperature research has limited the number of neutron detectors that can be deployed, however one may argue that cost and scalability have not played a large role in the design of $^3$He replacement technologies. This may limit the ability to expand to larger deployments of thermal neutron detection beyond the task of replacing $^3$He units. The present invention provides cost effective neutron monitoring which can be used at a very large number of trade routes throughout the world, including shipping, air, and rail travel. The goal is to make a large dent in the completion of a global security architecture by increasing the amount of $^3$He equivalent neutron detectors by ten to one hundred fold at a fraction of the cost of other technologies.

Slow neutrons can be detected with high efficiency by a few special detector materials. $^6$Li has a cross section of 940 barns for thermal neutrons in the reaction equation $^6$Li+ n→α+$^3$H. 4.786 MeV of kinetic energy is given off by the alpha (α) and triton ($^3$H) as they travel outward back to back from the reaction point. The mean free path for thermal neutron capture in enriched lithium is 229 microns, whereas the distances that the alpha and triton particles travel with the 4.786 MeV of kinetic energy received by the reaction are 23.3 and 135 microns respectively.

U.S. Pat. No. 4,365,159 by Young et al. shows the use of thin sheets or foils of lithium in a gas-filled multi-wire proportional chamber (MWPC). The lithium foil is sufficiently thin so that large particles created by reactions between incident neutrons and lithium nuclei escape the foil with sufficient energy to cause ionization of a detection gas in the chamber. Drift electrons from the ionizations are attracted to an array of wires in the chamber biased at a high voltage, and the resulting signals induced on the wires are detected and processed by electronic circuitry.

U.S. Pat. No. 4,447,727 of Friesenhahn et al. shows a large area neutron proportional counter constructed utilizing a large sealed metal box. The interior walls of the box are coated with $^6$Li enriched metal. A multicelled proportional counter structure within the internal space defined by the box is fabricated using a hydrogenous plastic.

US patent application publication 2006/0138340 of Ianakev et al. shows detector for detecting neutrons and gamma radiation that includes a cathode that defines an interior surface and an interior volume. A conductive neutron-capturing layer is disposed on the interior surface of the cathode and a plastic housing surrounds the cathode. A plastic lid is attached to the housing and encloses the interior volume of the cathode forming an ionization chamber, into the center of which an anode extends from the plastic lid. A working gas is disposed within the ionization chamber and a high biasing voltage is connected to the cathode. Processing electronics are coupled to the anode and process current pulses which are converted into Gaussian pulses, which are either counted as neutrons or integrated as gammas, in response to whether pulse amplitude crosses a neutron threshold

BRIEF SUMMARY OF THE INVENTION

Prior slow neutron detectors such as those described above include certain limitations and drawbacks that are preferably avoided. One challenge, for example, is to seal the detection chamber and to secure the lithium within it in such a way that the lithium does not react with the detector materials or otherwise degrade from exposure to other substances. Other challenges relate to the readout circuitry and the need for high discrimination between signals generated by slow neutrons versus noise from a variety of sources, including gamma radiation and microphonic effects from the tensioned detection wires.

A disclosed detector employs large, thin sheets or foils of lithium in a gas-filled multi-wire proportional chamber (MWPC). The lithium foil is sufficiently thin that large particles created by reactions between incident neutrons and lithium nuclei escape the foil with sufficient energy to cause ionization of a detection gas (e.g., argon) in the chamber. Drift electrons from the ionizations are attracted to an array of wires in the chamber biased at a high voltage, and the resulting signals induced on the wires are detected and processed by electronic circuitry to infer the incidence of neutrons from patterns of electrical signals appearing on the wires.

More particularly, a disclosed thermal neutron detector includes a planar detector housing having two glass panels spaced apart by a gas-tight seal to define a detection chamber, where the detection chamber includes an inert detection gas and one or more lithium foils each adhered to an inner surface of a respective glass panel. Each lithium foil emits alpha particles and tritons into the detection chamber in response to incidence of thermal neutrons, and the inert detection gas is ionized by the particles to generate drift electrons. The detector housing further includes a planar array of wires spaced apart from the lithium foils and having external portions extending outside the detection chamber through the gas-tight seal.

Electronic bias and detection circuitry is connected to the external portions of the wires, and it is operative during use of the neutron detector to (a) apply a field voltage between the wires and the lithium foils to establish a drift electric field in the detection chamber effective to attract the drift electrons to the wires, (b) provide a large electric field near the anode wires to cause electron multiplication near the wire resulting in large numbers of electrons and positive ions for each initial electron, and (c) detect electric signals in wires generated by the drift of positive ions away from the wires and interpret the electrical signals as incidence of thermal neutrons on the detector.

Among the advantages of the disclosed detector, it employs glass panels and other technology similar to those used in the window industry, and thus can leverage cost, design, durability, performance, and other characteristics of that technology. Additionally, several design features allow for both the long-term (more than one year) use of the argon fill gas without the need for recycling or flushing the gas. The first is the use of low outgassing materials for the construction of the chambers, such as low outgassing epoxy, stainless steel, aluminum, and glass. Secondly, desiccant strips, which collect gas impurities such as water and oxygen, are integrated into the edges of the detector wall. Lastly, designing the proportional gas multiplication to be on the order of 100-200 eliminates the need for quenching additives, which can create impurities over long term use. The creation of gas multiplication of about 100-200 allows for less expensive pre-amplification to be used. For example, within such a gas multiplication environment, using preamplifiers that create a 1 mV signal per 1 fC of charge and a readout circuit which has an overall noise level of 10 keV to 50 keV allows for the proper identification of a neutron events within the chamber for a 100 keV or greater energetic alpha or triton particle exiting the lithium surface into the readout gas. Such a threshold provides discrimination of other ionization events such as those caused by gamma rays that might be a source of false positive indications, and therefore allows for a maximal efficiency of the detector geometry.

The present invention provides a number of beneficial aspects including but not limited to the following.

An aspect of the invention is a radiation detector that is implemented as a proportional chamber which balances the low-noise requirements of the preamplification circuitry with an amount of gas multiplication such that there is a 100 keV threshold for ionizing radiation detection.

Another aspect of the invention is to create a long-term (more than one year) gas multiplication environment using argon fill gas without the need for recycling or flushing the gas by minimizing the voltages and gas gains required to less than 1300V and 250 respectively, so as not to employ age inducing quenching gas additives.

Another aspect of the invention is to create a long-term (more than one year) gas multiplication environment using argon fill gas without the need for recycling or flushing the gas by selection of low outgassing materials as the sole contact structures to the lithium and the internal gas volume of the detector.

Another aspect of the invention is to create a long-term (more than one year) gas multiplication environment using argon fill gas without the need for recycling or flushing the gas by providing a desiccant chamber in high volume contact with the gas volume as a getter to clean the gas.

Another aspect of the invention is to provide alternating ground wires between each high voltage anode wire to shape the ionization events occurring from neutron interactions with the detector so that they are more distinguishable from noise and gamma ray induced signals.

Another aspect of the invention is to use the digitized pulse that comes from the summation of preamplified signals or a single preamplified signal to delineate noise and gamma ray induced signals from events induced by neutrons.

Another aspect of the invention is the use of spray epoxy to secure the layer of lithium to the flat walls of the detector such that the outgassing of the flat wall does not destroy the lithium.

Another aspect of the invention is the use of glass as the material for the flat wall to reduce cost of the detector and provide a more rigid, non-vibrational surface to adhere the lithium.

Another aspect of the invention is to use a conductive metallic bus whose internal side is in contact with the lithium and external side is electrically connected to the ground of the circuit.

Another aspect of the invention is the use of low outgassing epoxy whose outgassing properties do not react adversely to the lithium.

Another aspect of the invention is that this low outgassing epoxy provide the connective substance in the thicknesses appropriate for full set strength of the metal and glass parts that are the boundaries for the gas volume of the detector.

Another aspect of the invention is that the epoxy provides the feedthrough for the field shaping and anode wires to pass from the internal gas volume to the external electronics portion of the detector.

Another aspect of the invention securing the field shaping and anode wires in a tensioned state with the epoxy that also serves as the gas seal for the detector.

Another aspect of the invention is the manufacturing procedure for the detectors that involves stacking, epoxy curing, laying down of pre-tensioned wires that lead to a fully sealed detector.

One of the beneficial features of the panel form factor is its scalability. It is not necessary to make a larger single-panel detector to provide detection over a larger area—rather, multiple smaller-size detectors can be arranged to cover the area and their outputs monitored by a central processing component. Additionally, flat glass panels may be more easily used in applications where anonymity of the detector is desired.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
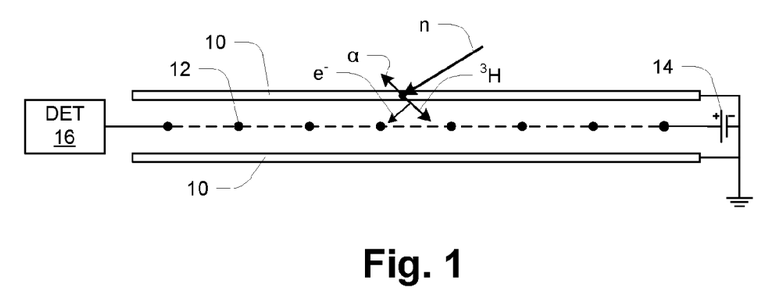
FIG. 1 is a schematic depiction of the principles of neutron detection according the present invention.

FIG. 1 is a schematic illustration of the detector and its operation. Two flat pieces of enriched lithium ($^6$Li) metal foil 10 are placed a small distance apart (e.g., 1 cm), with a single element gas like argon between the foils 10. A plane of wires 12 is positioned in the gas-filled gap between the foils 10, the wires being spaced apart at a pitch on the order of 5 mm. The wires alternate from ground to high voltage anode collection wires 12a and 12b. This creates a more uniform field around each high voltage wire which provides for a shape for the signals generated from neutron interactions with the detector that is more distinguishable from noise and gamma ray induced signals. In the illustrated embodiment, the wires 12 are alternating ground wires and wires maintained at a high positive voltage, ranging from 750V to 1300V, with respect to the Li foils 10, such as by a high-voltage DC power supply 14.

In operation, thermal neutrons n strike the foils 10 and react with Li nuclei, each reaction creating an alpha particle ($\alpha$) and a triton ($^3H$) traveling in opposite directions. One of these particles escapes from the lithium foil 10 and enters the gas-filled gap, where it has ionizing collisions with atoms/molecules of the gas. Drift electrons ($e^-$) produced by the ionization are attracted to the anode wires 12b where they produce electrical signals in the form of small-amplitude voltage pulses. Detection circuitry (DET) 16 amplifies these signals, sums the amplified signals from multiple wires, and performs additional processing on the summed amplified signals to detect a "signature" (predetermined pattern of voltage pulses) of a thermal neutron. The detection circuitry 16 design as well as the localized lithium product ionization allow good discrimination between neutrons and gamma rays.

For efficient operation it is important that the foils 10 be sufficiently thin that a high percentage of the particles created by incident neutrons escape the foil 10 and enter the gas region. One of the benefits of lithium is the ability to roll or extrude it to a desired thinness, which for this application is about 100 microns.

Figure 2:
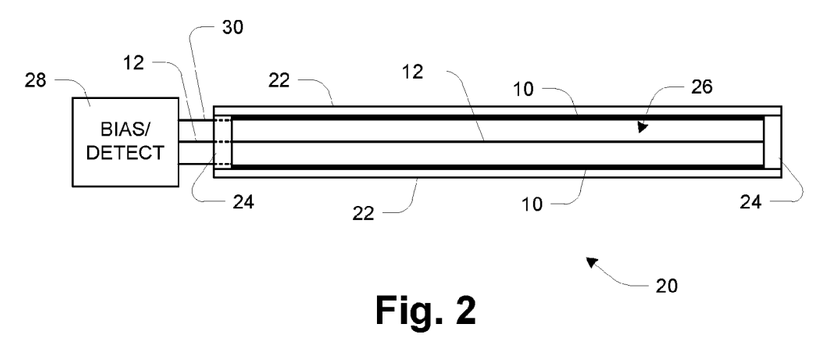
FIG. 2 is a quasi-schematic side view of a detection assembly.

FIG. 2 is a quasi-schematic side or edge view of a detector assembly 20 built and operable according to the general scheme of FIG. 1. It includes two spaced-apart planar glass panels 22 with a gas-tight edge seal 24 at an outer periphery, the seal 24 and panels 24 defining a chamber 26 containing an inert gas such as argon. The chamber 26 may be at 1 atmosphere absolute pressure. The inner surface of each glass panel 22 has a respective lithium foil 10 adhered thereto, and the anode wires 12 extend across the chamber 26 between and spaced from the foils 10. As shown, endmost portions of the wires 12 extend outside of the chamber 26 through the seal 24 and connect to bias and detection circuitry (BIAS/DETECT) 28 which provide the functions of the power supply 14 and detection circuitry 16 of FIG. 1. Additional electric feedthroughs 30 attach to the foils 10 as cathode-side connections (see connections of power supply 14 in FIG. 1).

Figure 3:
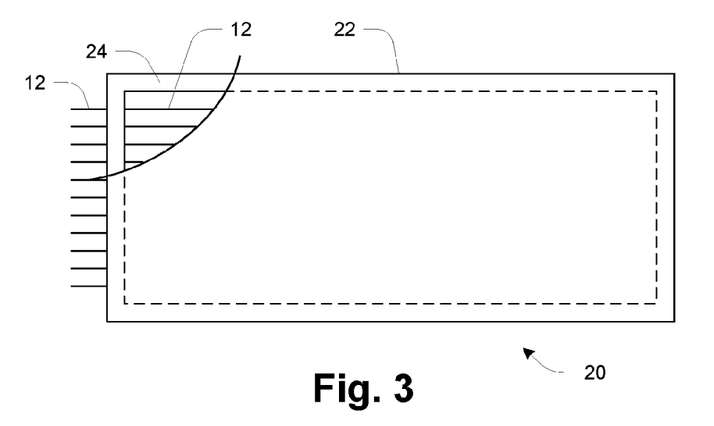
FIG. 3 is a quasi-schematic top view of the detection assembly.

FIG. 3 is a quasi-schematic plan view (e.g., top view) of the detector assembly 20. As shown, it has a generally rectangular shape. A cutaway view at upper left reveals the seal 24 extending around the periphery, indicated by a dotted line outside the cutaway area. Also revealed are the wires 12. The bias/detection circuitry 28 and cathode electrical feedthroughs 30 are omitted in the view of FIG. 3.

The foils 10 may be adhered to the glass panels 22 using a non-reactive, low-outgassing adhesive such as an epoxy. Conventional paste epoxy may be used, or a spray epoxy might be used in the alternative. One undesirable feature of glass is that it typically contains some measure of water, which in this application could adversely react with the lithium foils 10 causing premature degradation. The glass can be "baked out" by heating in a dry environment or stored in a dry environment prior to detector manufacturing in order to minimize water outgassing. In addition, the epoxy adhesive preferably isolates the foil 10 from the glass panel 22 to minimize direct exposure to the glass water outgassing. Also, the assembly 20 preferably employs some type of desiccant to draw water vapor out of the chamber 26. Desiccant may be incorporated into the seal 24 for example, similar to the arrangement used in double-paned windows.

It is generally desirable to avoid use of any reactive materials in the chamber 26 to avoid degradation of the lithium foils 10 and prolong the usable life of the detector 20. In the illustrated embodiment, the contents of the chamber 26 are limited to non-reactive materials such as the gold-plated wires 12, glass, stainless steel, aluminum, and low-outgassing epoxy. Specifically excluded from the chamber 26 is the circuitry 28, which will typically include more reactive materials including the "FR4" material commonly used in printed circuit boards.

Figure 4:
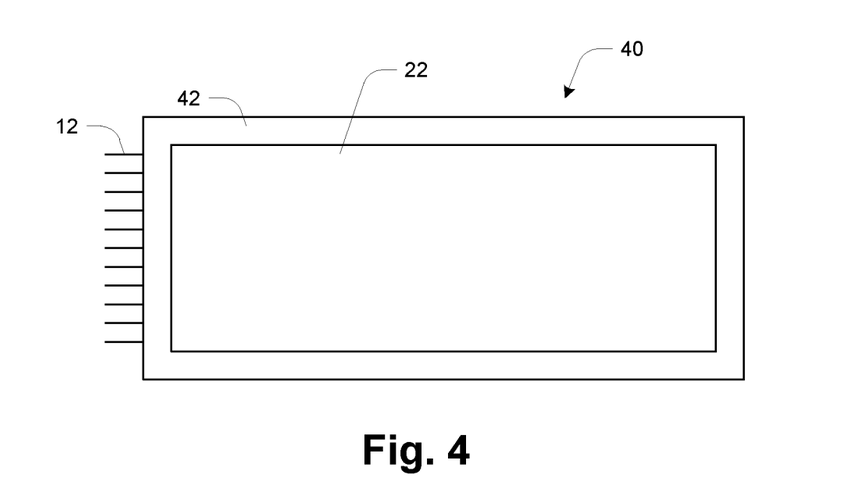
FIG. 4 is a quasi-schematic top view of a detection assembly according to another embodiment.
Figure 5:
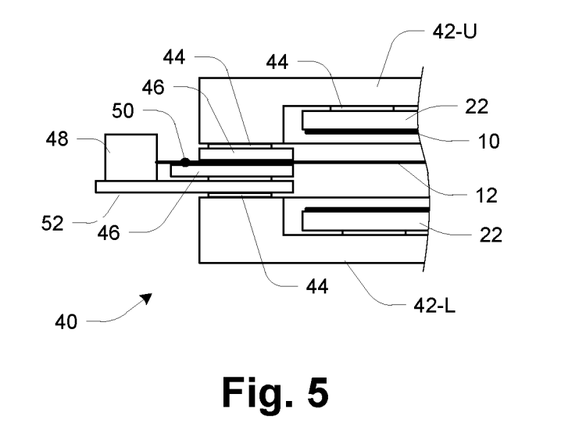
FIG. 5 is a quasi-schematic side view of an edge portion of the detection assembly of FIG. 4.

FIGS. 4 and 5 illustrate a detector assembly 40 generally similar to that of FIGS. 2 and 3, except that it employs a rigid non-glass frame 42 around the periphery of the glass panels 22. The frame 42 provides greater structural robustness as well as providing an electric feed-through 30 through which the cathodic lithium strips are connected to the ground of the circuitry 48. It may also provide features for mounting the detector assembly 40 as may be required during installation. Generally, a strong and non-reactive metal, such as stainless steel or aluminum, is preferred for the frame 42.

FIG. 5 is a side view illustrating the configuration of a particular embodiment of the detector assembly 40 at one end. The frame 42 has two pieces, an upper frame piece 42-U and a lower frame piece 42-L, each having an L-shaped notch or groove extending around its inner edge, and each glass panel 22 is adhered to a respective frame piece 42-U, 42-L via a bead of adhesive 44 such as epoxy. A pair of insulating spacers 46, preferably of glass, are used for passage of the wires 12 to circuitry 48, which will generally include at least a preamplifier portion of the detection circuitry 16 (see further description below). The adhesive that acts as the seal between the insulating spacers 46 also maintains the tension of wires 12 and acts as a feed-through for the wires 12. In order to maximize the joint strength between the wires 12 and the insulating spacers 46, the adhesive must feely flow completely around the wire before curing. This is allowed by etching a groove along the insulating spacers 46 that the wire is flush against. A separate rigid substrate 52, such as of stainless steel or aluminum, extends away from the frame 42 and provides support for the circuitry 48. As shown, the spacers 46 and substrate 52 are arranged in a stack, adhered to each other and to the frame pieces 42-U, 42-L via beads of adhesive 44.

Although in FIG. 5 the substrate 52 is shown as an individual element, in an alternative embodiment it may be formed as an extension of the lower frame piece 42-L.

One of the concerns for MWPC detectors with low energy thresholds is so-called "microphonics", the phenomenon of unwanted electrical noise induced by mechanical vibration (specifically of the wires 12). Microphonics can be addressed by proper mechanical design that increases mechanical resonant frequencies above typical ambient vibration frequencies. In one embodiment, the wires 12 may be gold plated tungsten-rhenium wires of approximately 50 microns in diameter. Wires of this type can be safely stretched to a tension of 450 grams without risk of breakage. Analysis shows that 30-cm wires of this type and tension have a fundamental resonant frequency of about 600 Hz, which may provide acceptable performance in normal operating environments. If necessary, the wires 12 can be stabilized using supports placed inside the chamber 26 from materials that do not generate unwanted outgassing. Such stabilization may be particularly desirable for larger detectors using correspondingly longer wires 12.

Figure 6:
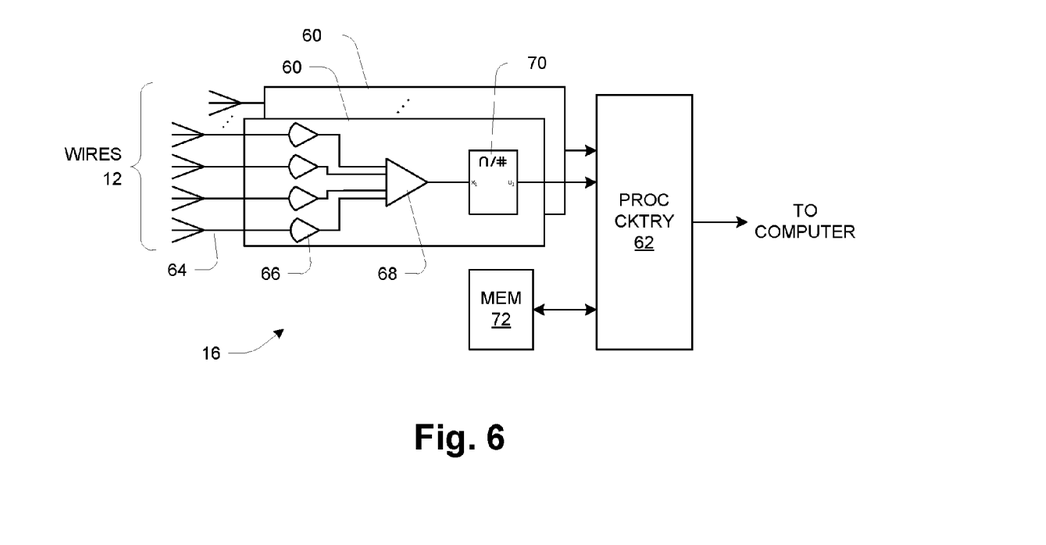
FIG. 6 is a schematic diagram of detection circuitry.

FIG. 6 illustrates an embodiment of the detection circuitry 16, also referred to as "readout" circuitry. The readout circuitry 16 generally includes sets 60 of front-end circuitry, each set 60 generating a respective output provided to processing circuitry (PROC CKTRY) 62 which is described below. In many applications, it is not necessary to identify the specific direction or position information of incident neutrons. In these cases, it is not important to know which specific wire(s) 12 produce signals from drift electrons created by the triton or alpha particles entering the readout gas, nor the location of a track of electrons along a wire 12. The readout circuitry can therefore be designed to maximize the efficiency of detecting neutrons within the MWPC geometry. Neutron detection efficiency is maximized by setting the lowest energy limit, so that all signals above the limit can be attributed to neutrons. The lower energy limit is affected by several types of noise, as well as gamma ray radiation background signals. The noise that contributes to the energy limit is thermal noise, radio frequency noise, amplification circuit noise, and signal digitization noise. The purpose of the set-based organization is to minimize the lower energy limit for a given detector geometry (detector length and width). Additionally, it may be desirable to connect multiple wires 12 together before a first preamplifier of a set 60 (so called "wire ganging") to reduce pre-amplification and summing amplification noise as well as cost. Drawbacks of wire ganging include increased input capacitance and susceptibility to radio-frequency (RF) noise, which increasing the lower energy limit. Radio-frequency (RF) noise can be addressed through use of known RF shielding techniques including use of a Faraday. Combining more wires together into a single set 60 also reduces cost but increases the lower energy limit due to non-localized gamma-ray ionization events. For each detector size and cost, there will be an optimal arrangement of wire ganging, preamplifier summing, and digitization.

Each set 60 receives a number of wire gangs 64, each having one or more of the wires 12 directly connected together (where the degenerate case of one wire per gang is equivalent to no ganging). The wire gangs 64 are connected to inputs of respective preamplifiers 66. In the illustrated example, each gang 64 includes three wires 12, and each set 60 includes four preamplifiers 66 for four wire gangs 64. Generally, the number of sets 60 is W/(PG), where W is the total number of wires 12 whose signals are to be processed by the processing circuitry 62, P is the number of preamplifiers 66, and G is the number of wires per gang 64. The outputs of the preamplifiers 66 are provided to a summing amplifier 68 whose output is proportional to the sum of the signals from the preamplifiers 66. The output from the summing amplifier 68 is provided to an analog-to-digital (A/D) converter 70. Digital signal samples from the A/D converter 70 are provided to the processing circuitry 62.

The processing circuitry 62 may be implemented in a variety of ways. In one embodiment, it can be realized using a complex programmable logic device or CPLD, programmed to perform sample acquisition and front-end signal processing, sending the resulting signal data to a separate processor or computer for higher-level processing. The processing circuitry 62 may utilize a separate memory 72 for storage of data, as well as storage of executable instructions of an operational program in the case that the processing circuitry 62 is a stored-program processor such as a microprocessor or microcontroller. Either the processing circuitry 62 or separate higher-level processor may employ timing and logic circuitry to avoid any undesirable double counting of tracks from the same neutron-induced ionization event.

Figure 7:
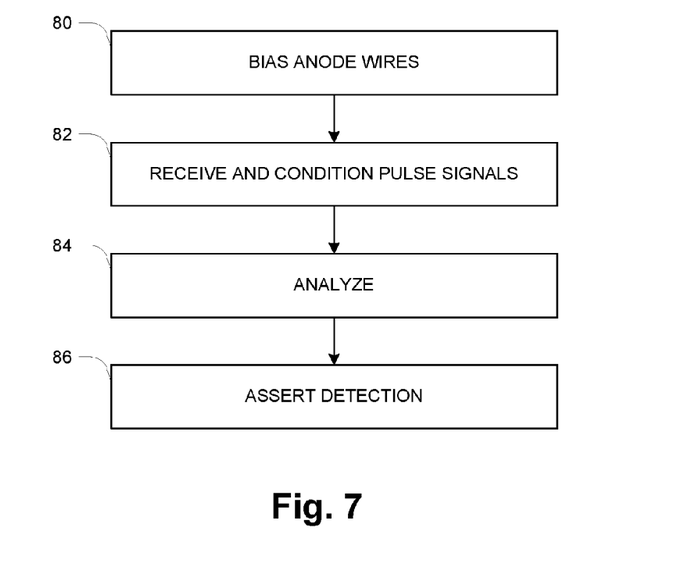
FIG. 7 is a flowchart of operation.

FIG. 7 illustrates the general manner of operation of the detection scheme described herein. At 80, a suitably high DC bias is applied to the anode wires 12 with respect to the lithium foils 10 to create a sufficiently strong electric field to direct the drift electrons from ionization events to the anode wires 12. At 82, the signal pulses produced on the anode wires 12 are received and conditioned at the detection circuitry 16, where "conditioned" refers to the preamplification, summing, etc. performed by the sets 60. At 84, the conditioned pulse signals are analyzed in a desired manner to detect signal patterns corresponding to ionization events, as distinct from gamma ray events or other potential noise, by either pulse height or shape characteristics.

The above-discussed discrimination is included in the analysis of step 84. At 86, the result of the analysis at 84 is used to assert detection of incident neutrons, such assertion being usable in some system-specified manner. For example, the assertion might be used to activate a security alarm in applications for detecting smuggled radioactive material.

FIGS. 8-15 show two alternative arrangements for detector assemblies. Generally these differ from the arrangement of FIG. 5 in that the frame pieces are located at the inner surfaces of the glass panels rather than at the outer surfaces as in FIG. 5. This enables certain advantageous features as described below.

Figure 8:
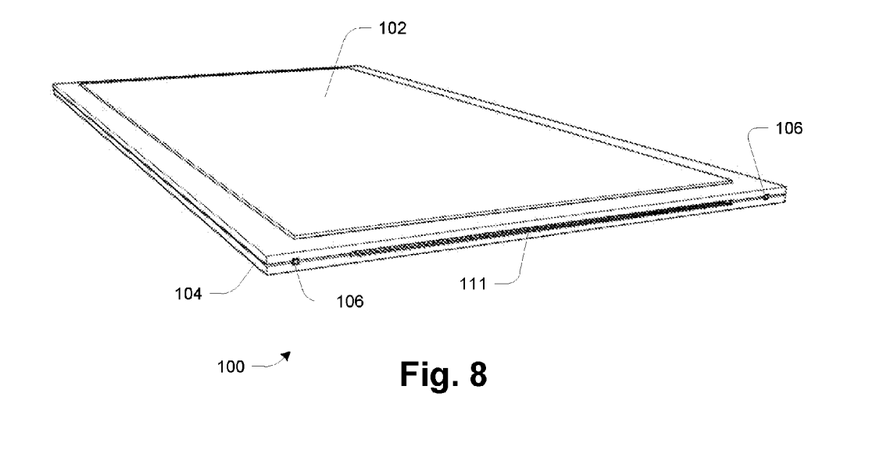
FIG. 8 is a perspective view of a detector assembly according to one embodiment.

FIG. 8 shows an embodiment of a detector assembly 100 in which the glass panels 102 (note the use of -U to designate "upper" and -L to designate "lower") are on the outside of a rigid metal frame 104 forming the complete peripheral edge. Among the features is a pair of desiccant strips 106 along two edges, which as described below are in fluid communication with the internal chamber to reduce the level of water vapor present in the chamber. Also visible in FIG. 8 are outer portions of anode wires 111 that extend through a shallow opening at one end of the frame 104.

Figure 9:
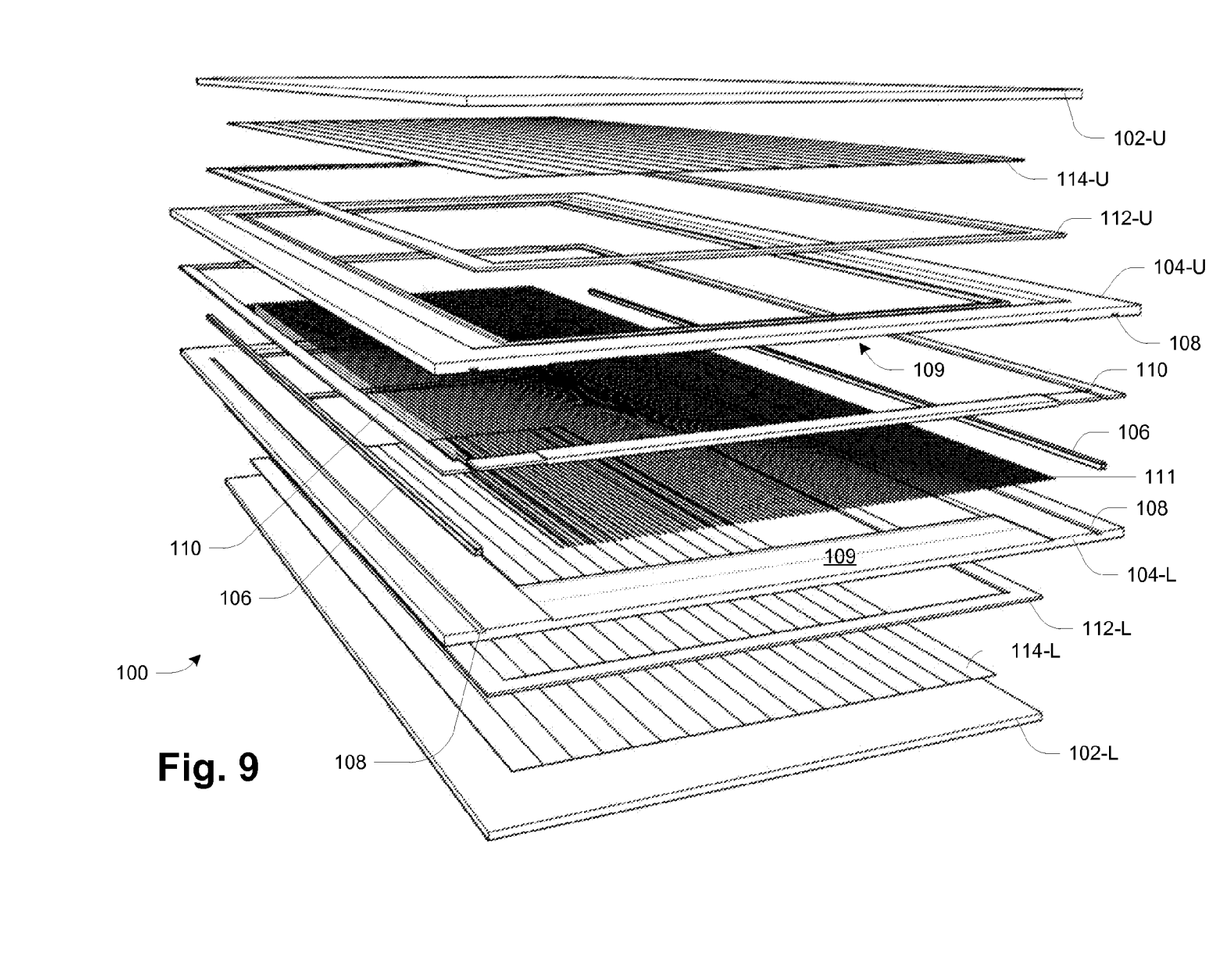
FIGS. 9-11 are isometric section views of portions of the detector assembly of FIG. 8.

FIG. 9 shows the detector assembly 100 in exploded view. The frame 104 has two pieces, an upper frame piece 104-U and a lower frame piece 104-L, each having a notch or groove 108 extending along two side edges to hold the desiccant strips 106. Each frame piece 104 also has a slightly depressed front edge section 109 to form a shallow opening for passage of the anode wires 111. The frame pieces 104 are joined by epoxy 110. Each glass panel 102 is an outer member adhered to an outer face of a respective frame piece 104 by respective epoxy 112. To the inside of each glass panel 102 is adhered a respective set of lithium strips 114 in a planar layer (either abutting or with slight overlap among adjacent strips) as shown.

Figure 10:
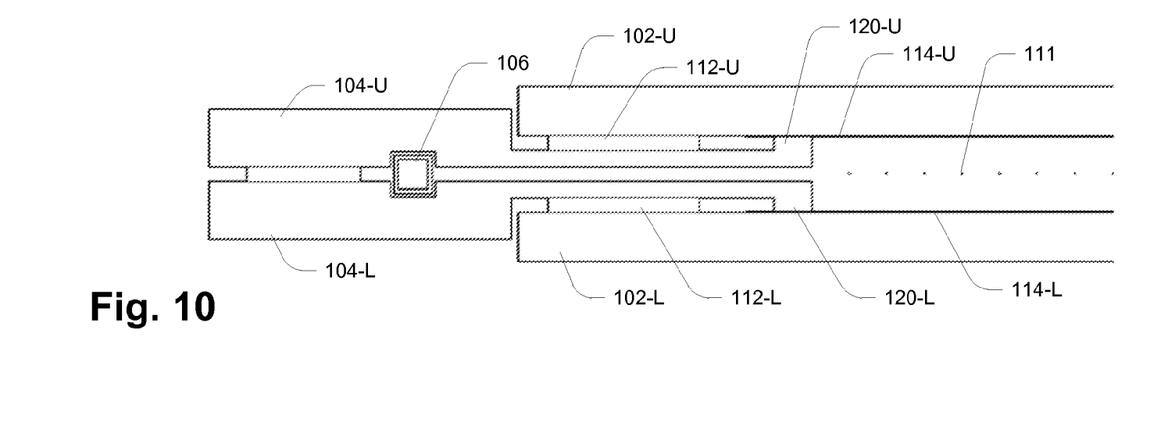
Figure 11:
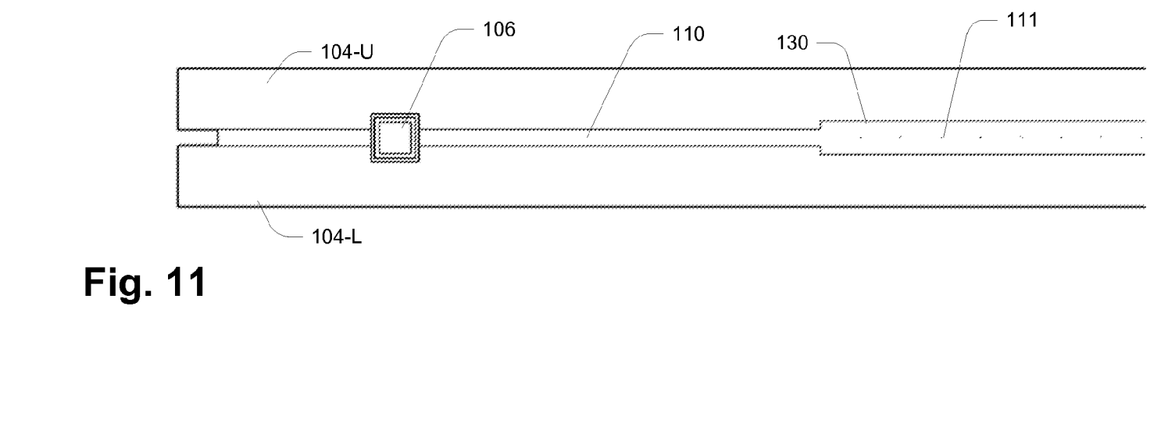

FIGS. 10 and 11 show certain additional features of the detector assembly 100. FIG. 10 represents a section across a central part of the left edge in FIG. 8. As shown, each frame piece 104 has a respective L-shaped inner portion 120 that extends into the chamber and is in direct contact with the respective lithium strips 114. An alternative embodiment is to replace the L-shaped inner portion 120 with low-outgassing conductive epoxy. Either of these arrangements places the lithium strips 114 at the same electrical potential as the frame 104. This bias/detection circuitry 28 (FIG. 2) is referenced to the potential of the frame 104, taken as a system ground. This ensures that the proper bias voltage is developed between the anode wires 111 and the lithium strips 114 in operation.

FIG. 11 represents a section along the front edge in FIG. 8, showing the shallow opening 130 through which the anode wires 111 pass. The epoxy 110 provides the feedthrough for the anode wires 11 to pass from the internal gas volume to the external electronics portion of the detector.

Figure 12:
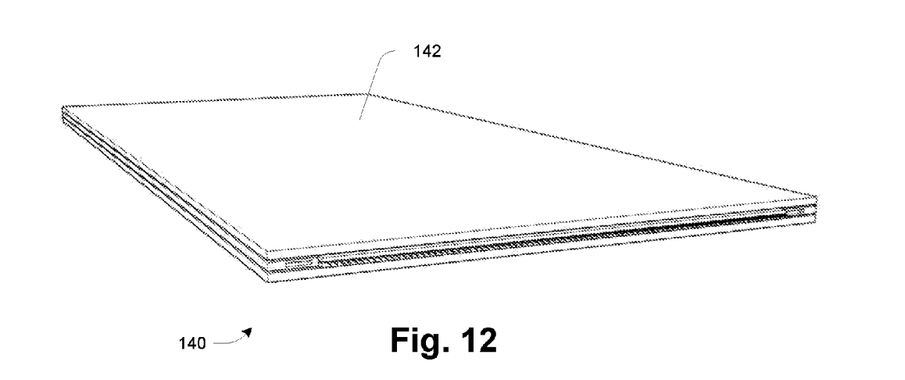
FIG. 12 is a perspective view of a detector assembly according to another embodiment.

FIG. 12 shows a detector assembly 140 that relies more on the glass panels 142 themselves for structural strength and rigidity. It lacks unitary surrounding frame pieces such as the frame pieces 104 shown in FIG. 10, instead relying on metal side frame pieces and glass spacers at front and rear edges.

Figure 13:
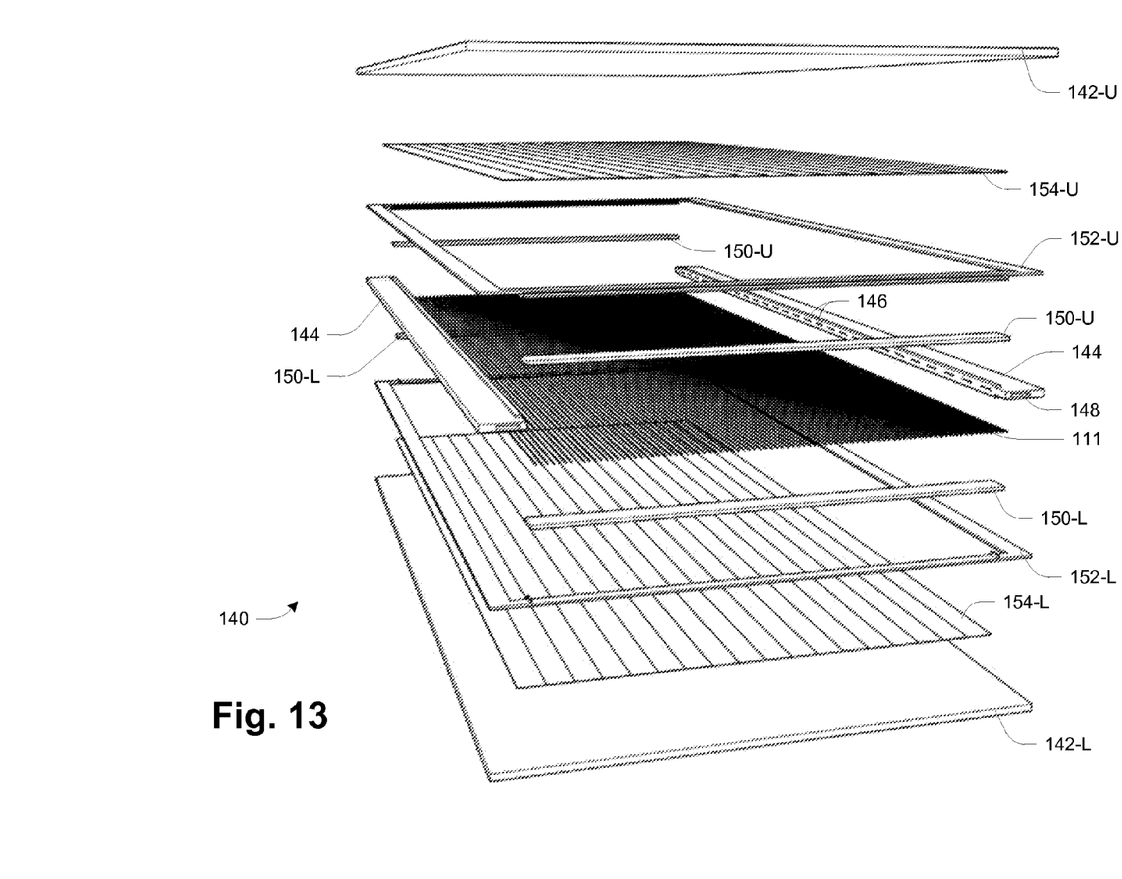
FIGS. 13-15 are isometric section views of portions of the detector assembly of FIG. 12.

FIG. 13 shows the detector assembly 140 in exploded view. As mentioned, it employs two metal side frame pieces 144 along with front and back glass spacers 150 sandwiched between the glass panels 142. Each frame piece 144 includes a lengthwise channel 148 to hold a desiccant strip (not shown). The channel 148 is in fluid communication with the chamber via a set of openings 146 extending from the channel 148 to an inner surface of the frame piece 148. As in the other embodiments, the lithium strips 154 are adhered to the inner surfaces of the glass panels 142. Epoxy 152 attaches each panel 142 to the frames 148 and glass spacers 150.

Figure 14:
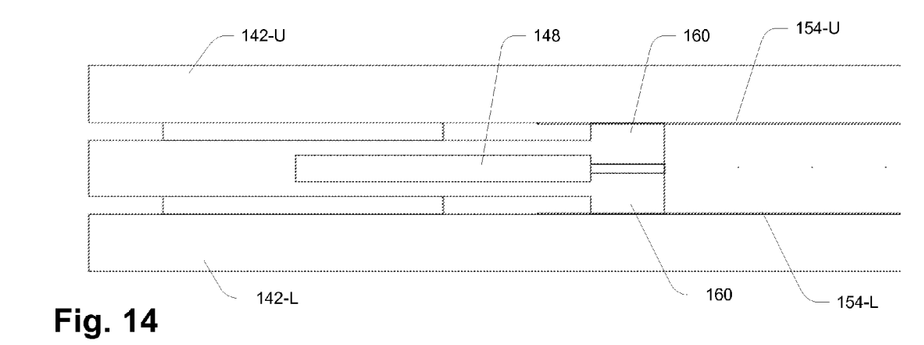

FIG. 14 shows a section across a central part of the left edge in FIG. 13. The frame piece 144 includes L-shaped portions 160 that extend into the chamber and are in direct contact with the lithium strips 154 for grounding purposes as discussed above for FIG. 10.

Figure 15:
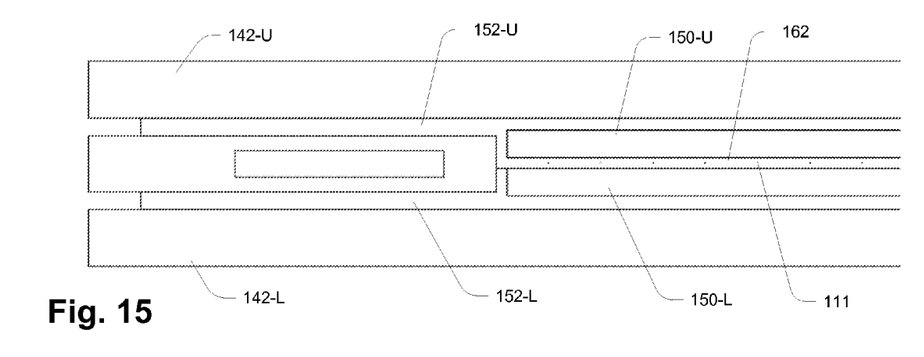

FIG. 15 shows the front edge, specifically the arrangement of the epoxy 152 that bonds the glass spacers 150 to the glass panels 12 and seals the front edge while also providing for passage of the wires 111. It will be noted that the upper epoxy 152 is slightly thicker and has the respective spacer 150-U completely embedded in it, leaving a thin section 162 between the two spacers 150 through which the wires 111 extend.

The detector assembly of FIGS. 12-15 may enjoy a cost advantage over that of FIGS. 8-11 by avoiding the need for the large, machined frame pieces 104 that completely surround the assembly.

Detectors according to the present invention may be manufactured in a number of alternative ways, the following being described by way of example and not limitation.

The following steps comprise a manufacturing process
(a) laying down the first piece of lower glass within a dry environment,
(b) spraying epoxy on the top surface of the glass,
(c) placing lithium foil on top of the epoxy to form a surface,
(d) epoxying glass to the frame; enabling conductive electrical bus feed-through of the frame to make electrical connection with the lithium,
(e) performing steps (a)-(d) on top surface as well,
(e) placing desiccant strip with molecular sieve desiccant internal into the lower holder of the frame,
(f) epoxying circuit board with electronics on outward support, awaiting wires,
(f) suspending the wires in proper position above the lower frame so that they are 5 mm away from lower lithium surface and flush with their contact points on the circuit board,
(g) epoxying the top frame and bottom frame together, creating the main seal and feedthrough for the wires,
(f) soldering wires onto the connective pads on the circuit board and cut wire off of tensioning frame,
(g) flowing gas into system through the desiccant strip channels until full epoxy dry,
(h) place desiccant strips within the channels,
(i) sealing desiccant strip hole with epoxy and metal plate.

While various embodiments of the invention have been particularly shown and described, it will be understood by those skilled in the art that various changes in form and details may be made therein without departing from the spirit and scope of the invention as defined by the appended claims.

What is claimed is:

1. A thermal neutron detector, comprising:
a planar detector housing having two glass panels spaced apart by a gas-tight seal to define a detection chamber, the detection chamber including an inert detection gas and one or more lithium foils each adhered to an inner surface of a respective glass panel to emit tritons into the detection chamber in response to incidence of thermal neutrons, the inert detection gas being ionizable by the tritons to generate drift electrons, the detector housing further including a planar array of wires spaced apart from the lithium foils, the wires having external portions extending outside the detection chamber through the gas-tight seal; and
electronic bias and detection circuitry connected to the external portions of the wires and being operative to (a) apply a field voltage between the wires and the lithium foils to establish a drift electric field in the detection chamber effective to attract the drift electrons to the wires, and (b) detect electric signals generated by the drift electrons in the wires and interpret the electrical signals as incidence of thermal neutrons on the detector, wherein the detector uses a conductive metallic bus having an internal side in contact with the lithium foils and an external side electrically connected to a ground reference of the bias and detection circuitry.

2. A detector as in claim 1, wherein the detector is implemented as a proportional chamber which balances low-noise requirements of the preamplification circuitry with gas multiplication of greater than 50 but less than 200 to allow a 150 keV or less threshold for ionizing radiation detection.

3. A detector as in claim 1, wherein the detector employs a long-term gas multiplication environment using argon fill gas without the need for recycling or flushing the gas by selection of low outgassing materials as the sole contact structures to the lithium foils and the inert detection gas of the detector.

4. A detector as in claim 1, wherein the detector employs a long-term gas multiplication environment using argon fill gas without the need for recycling or flushing the gas by providing a desiccant chamber in high volume contact with the inert detection gas as a getter to clean the gas.

5. A detector as in claim 4, wherein the desiccant chamber is formed by one or more desiccant strips along respective edges of the detector housing, the desiccant strips being in fluid communication with the detector chamber to reduce a level of water vapor present in the detector chamber.

6. A detector as in claim 5, wherein the detector housing includes a frame having an upper frame piece and a lower frame piece, each frame piece having a notch or groove extending along two side edges to hold the desiccant strips.

7. A detector as in claim 1, wherein the planar array of wires includes alternating ground wires between high voltage anode wires to shape ionization events occurring from neutron interactions with the detector and thereby make the ionization events more distinguishable from noise and gamma ray induced signals.

8. A detector as in claim 1, wherein the detector uses digitized pulses from a summation of preamplified signals or a single preamplified signal to delineate noise and gamma ray induced signals from events induced by neutrons.

9. A detector as in claim 1, wherein the detector uses spray epoxy to secure the lithium foils to the glass panels of the detector to prevent any outgassing of the glass panels from destroying the lithium foils.

10. A detector as in claim 1, wherein the detector connects the lithium to the conductive metallic bus by direct contact of the lithium to the metallic bus.

11. A detector as in claim 1, wherein the detector connects the lithium to the conductive metallic bus by employing a low outgassing conductive epoxy.

12. A detector as in claim 1, wherein the detector uses low outgassing epoxy whose outgassing properties do not react adversely to the lithium foils.

13. A detector as in claim 1, wherein low outgassing epoxy provides connective substance in a thicknesses appropriate for full set strength of metal and glass parts forming boundaries for the inert detection gas of the detector.

14. A detector as in claim 1, wherein low outgassing epoxy provides a feed-through for the wires to pass from the detection chamber to the electronic bias and detection circuitry of the detector.

15. A detector as in claim 1, wherein tension of the wires is secured with an epoxy that also serves as a gas seal for the detector.

16. A detector as in claim 1, manufactured by a procedure that involves stacking, epoxy curing, laying down of pre-tensioned wires that lead to a fully sealed detector.

17. A detector as in claim 1, further including a rigid metallic frame at a peripheral edge of the glass panels.

18. A detector as in claim 17, wherein the rigid metallic frame is disposed in sealed fashion between the glass panels to define at least a portion of a peripheral boundary of the detection chamber.

19. A detector as in claim 18, wherein the rigid metallic frame has an annular shape to completely surround the detection chamber.

20. A detector as in claim 19, wherein the rigid metallic frame includes two symmetrical annular frame members in mutually sealed relationship.

21. A detector as in claim 18, wherein the rigid metallic frame includes two spaced-apart elongated frame members at opposing peripheral portions of the detection chamber.

22. A detector as in claim 1, wherein the glass panels are of a type used for glass windows.

* * * * *